United States Patent
King et al.

(10) Patent No.: US 11,267,139 B2
(45) Date of Patent: Mar. 8, 2022

(54) GRIPPER FOR AUTOMATED TUBE HANDLING

(71) Applicant: SCINOMIX, INC., Earth City, MO (US)

(72) Inventors: Edward E King, Dayton, OH (US); Nigel Malterer, Weldon Spring, MO (US); Michael Chrisco, St. Louis, MO (US)

(73) Assignee: Scinomix, Earth City, MO (US)

( * ) Notice: Subject to any disclaimer, the term of this patent is extended or adjusted under 35 U.S.C. 154(b) by 0 days.

(21) Appl. No.: 16/579,927

(22) Filed: Sep. 24, 2019

(65) Prior Publication Data

US 2021/0308876 A1    Oct. 7, 2021

(51) Int. Cl.
| | | |
|---|---|---|
| *B25J 15/02* | (2006.01) | |
| *B25J 15/10* | (2006.01) | |
| *G01N 35/00* | (2006.01) | |
| *B25J 9/10* | (2006.01) | |

(52) U.S. Cl.
CPC ............ *B25J 15/10* (2013.01); *B25J 9/102* (2013.01); *G01N 35/00732* (2013.01); *G01N 2035/00752* (2013.01)

(58) Field of Classification Search
CPC ........ B25J 15/026; B25J 15/10; B25J 15/103; B25J 15/106; B25J 13/081–084; B25J 9/102; G01N 35/00732; G01N 35/00752
See application file for complete search history.

(56) References Cited

U.S. PATENT DOCUMENTS

| | | | | |
|---|---|---|---|---|
| 4,598,942 A | * | 7/1986 | Shum | B25J 15/103 294/106 |
| 4,600,357 A | * | 7/1986 | Coules | B25J 13/082 294/106 |
| 5,280,981 A | | 1/1994 | Schulz | |
| 5,342,254 A | * | 8/1994 | Sula | B25J 9/102 475/223 |
| 5,501,498 A | * | 3/1996 | Ulrich | B25J 13/084 294/106 |
| 6,264,419 B1 | * | 7/2001 | Schinzel | B25J 9/023 294/119.1 |

(Continued)

FOREIGN PATENT DOCUMENTS

| | | |
|---|---|---|
| DE | 102012220294 | 5/2014 |
| JP | H1194681 A | 4/1999 |
| WO | 2017143182 | 8/2017 |

OTHER PUBLICATIONS

Sci Print VXL labeling instrument (https://www.youtube.com/watch?v=kWcEAhGexFM), (No date).

(Continued)

*Primary Examiner* — Dean J Kramer
(74) *Attorney, Agent, or Firm* — Summa PLLC

(57) ABSTRACT

A method of (and an associated device for) applying or measuring the force applied to a sample tube is disclosed. The method includes the steps of driving a plurality of gripping fingers from an open position to a gripping position against a tube, while measuring the movement of first and second coaxial gears driving the fingers before the fingers grip the tube, stopping the movement of the first coaxial gear when the fingers grip the tube, and allowing and measuring a further limited movement of the second coaxial gear after the fingers grip the tube.

20 Claims, 14 Drawing Sheets

(56) References Cited

U.S. PATENT DOCUMENTS

| | | | |
|---|---|---|---|
| 8,534,729 B2* | 9/2013 | Wilkinson | B25J 15/08 |
| | | | 294/106 |
| 9,156,171 B2* | 10/2015 | Hecht | B25J 15/086 |
| 2013/0336755 A1 | 12/2013 | Neeper | |
| 2017/0173801 A1* | 6/2017 | Gebrian | B25J 15/026 |
| 2018/0029031 A1 | 10/2018 | Strauss | |
| 2018/0290310 A1 | 10/2018 | Strauss | |
| 2018/0345502 A1 | 12/2018 | Amano | |
| 2019/0126491 A1 | 5/2019 | Harkleroad | |

OTHER PUBLICATIONS

Z Evid Fortbild Qual Gesundhwes. Sep. 2018; 135-136:10-17 doi: 10.1016/j.zefq 2018.07.007. Epub Aug. 14, 2018. Specimen labelling: A complex process with a high error rate].

Improving the Collection and Management of Human Samples Used for Measuring Environmental Chemicals and Nutrition Indicators; U.S. Department of Health and Human Services Centers for Disease Control and Prevention; Version 1.3—Mar. 2018.

European Extended Search Report issued in EP20197878.0, dated Feb. 22, 2021, 40 pages.

* cited by examiner

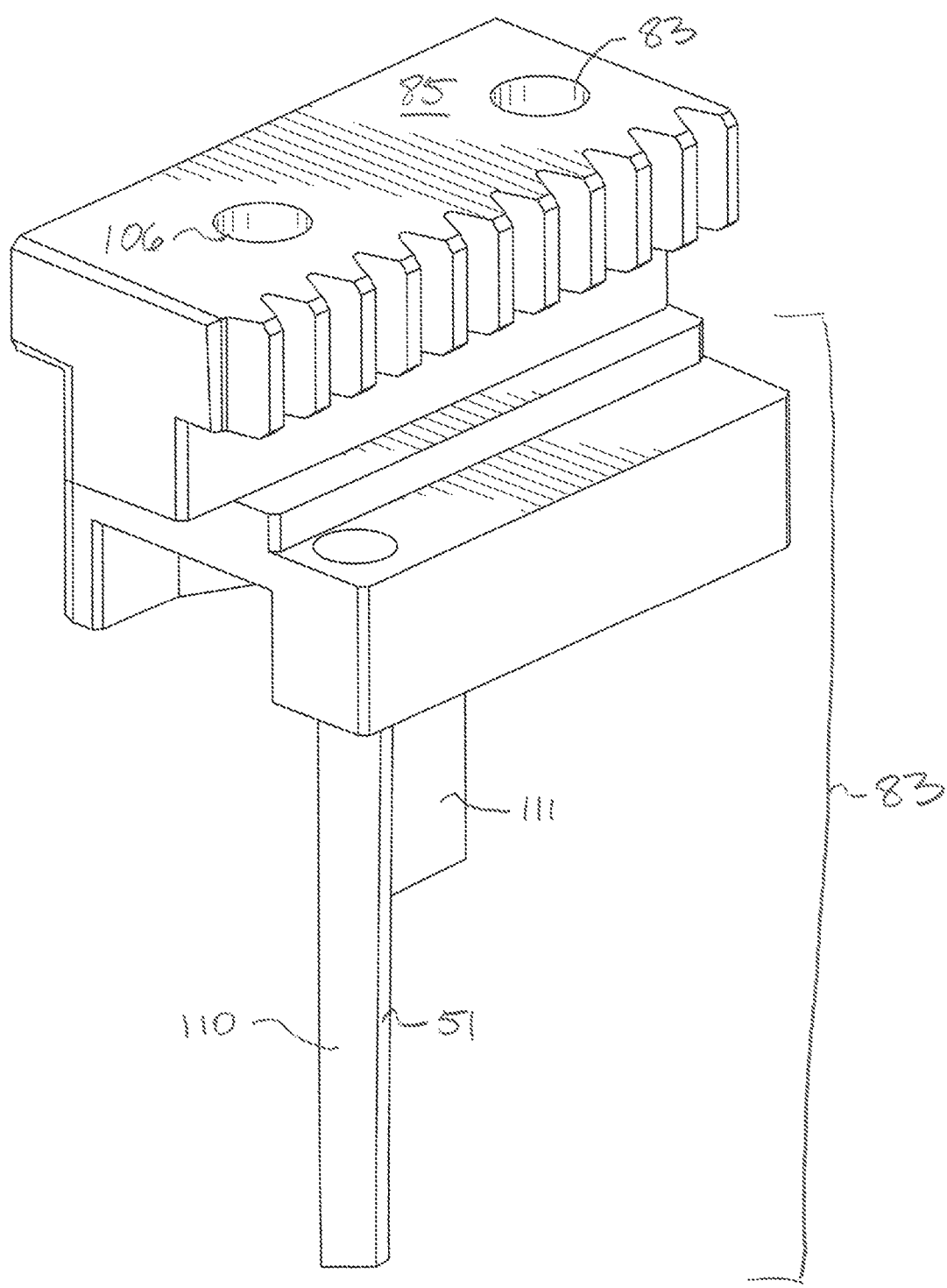

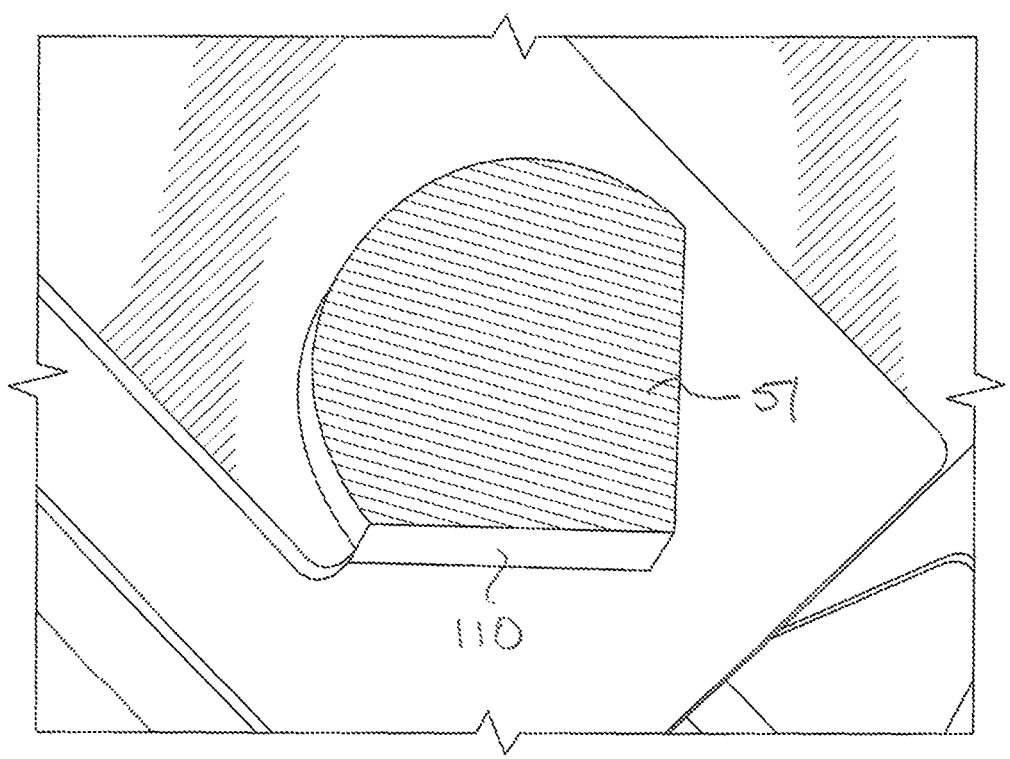

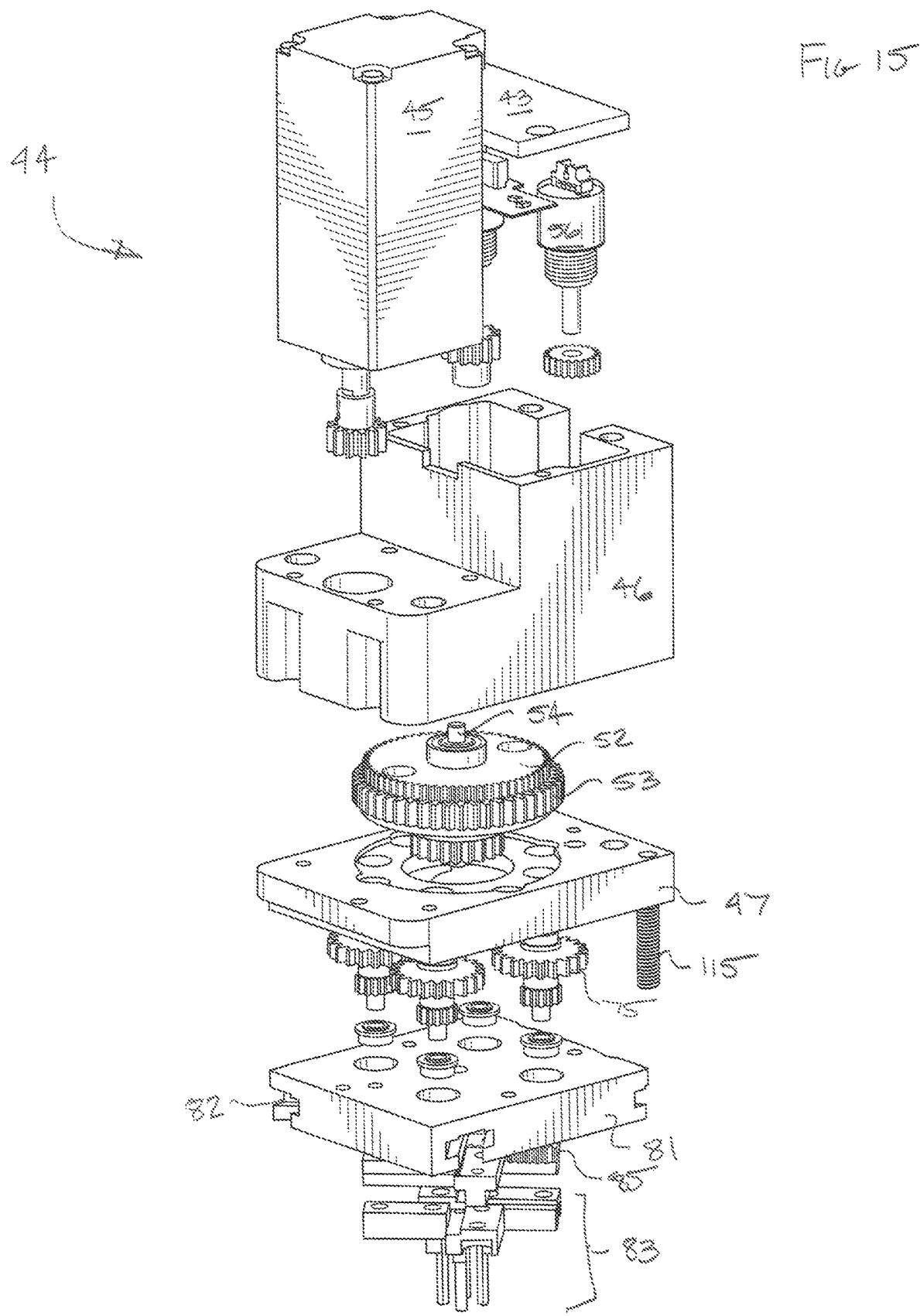

GRIPPER FOR AUTOMATED TUBE HANDLING

BACKGROUND

The invention is in the field of equipment that handles medical or other laboratory sample tubes. Many types of laboratories in several broad fields process large quantities of samples in tubes for research and development, manufacturing and clinical research (e.g. the medical and pharmaceutical industries) chemical synthesis and analysis, water treatment, food safety, and environmental monitoring and testing. In almost every case, sample tubes move from person to person or place to place or both, making accurate, detailed records mandatory. In many cases the relevant laboratory will use a laboratory information management system (LIMS) to codify and help automate such laboratory tasks.

In the medical laboratory environment, sample tubes (e.g., containing blood or other fluids) are frequently moved, opened, labeled, closed, and moved again by automated equipment. Other steps (e.g., adding reagent) can take place between these steps.

As one, but not the only context of tube use and movement, biomonitoring represents an important tool for evaluating the health status of human beings. Measuring substances or their biomarkers in human specimens (e.g., urine, blood, and serum) provides identification of disease, increased disease risk, certain nutrition deficiencies, and in some cases exposure to harmful compounds.

Using specific sensitive analytical methods, including handling of samples, is critical to accurate biomonitoring. Such handling accuracy includes steps and goals such as collection, management, preservation, avoiding external contamination, quality control, and integrity of samples and the target analytes they contain. Proper processing, storage, and transport is required to maintain such sample integrity because in most cases biomonitoring requires the highest possible quality standards. See, e.g., Improving the Collection and Management of Human Samples Used for Measuring Environmental Chemicals and Nutrition Indicators; U.S. Department of Health and Human Services Centers for Disease Control and Prevention; Version 1.3 Mar. 2018.

Automated tube labeling does not always solve all sampling identification issues, but can be of assistance given that some studies indicate that the majority (about 52%) of labeling errors are corrected in the laboratory (i.e., after if a specimen has been collected) or not until the test results are associated with a patient (about another 25%). A COMPLEX PROCESS WITH A HIGH ERROR RATE. Z Evid Fortbild Qual Gesundhwes. 2018 September; 135-136:10-17. doi: 10.1016/j.zefq.2018.07.007. Epub 2018 August 14.

In some steps the relevant tubes are lifted using a plurality of reciprocating gripping fingers carried by a robotic arm, or some equivalent. Tubes come in a variety of sizes, however, with a range of 0.5 mL-50 mL being typical. In many cases, the tubes are taken to and from racks that resemble microtiter plates. Thus, the spacing between tubes in the robotic environment differs based on the size the tube and the microtiter racks. A gripping mechanism that is appropriate for one size tube establishes at least two problems for a different size tube: the gripper can't match the tube size and the fingers will strike other tubes during their reciprocal movement (on the backswing, so to speak).

Based on these factors, using a robotic instrument between and among the various tube sizes typically requires that an appropriate set of reciprocating fingers be switched in and out to match either a single tube size or a small range of tube sizes. The delay introduced by this step increases the overall time required to perform the relevant movements of the tubes, thus reducing efficiency and increasing costs. A hospital may carry out dozens or hundreds of tube handling steps every day, while a research laboratory may carry out thousands.

In addition to lacking range of movement, different tube handling steps require applying different amounts of force to a tube. For example, the step of grasping and lifting a tube requires much less force than does gripping a capped tube in an uncapping device. Grippers without such force range must apply the maximum force at all times, wasting energy and increasing the wear and tear on the physical elements of the device, or wear and tear (including potential breakage) of the tubes themselves.

As another disadvantage, some conventional tube grippers attempt to measure the state of the driving motor or the fingers (or both) using the current to the motor. The assumption that this provides the desired information is not always accurate.

SUMMARY

The invention includes a set of reciprocating fingers assembled to move, grip, and otherwise handle a much larger variety of tube sizes in this context.

The gripper is driven using a motor. The motor transfers the rotary motion from the motor through a gear train to move a rack and pinion system. Two rotary encoders are present. The first rotary encoder provides information on the position of the gripper (fingers) with respect to the home position and responds directly to the rotary distance the main gear has travelled. When the grippers encounter a tube, the main gear stops turning as motor turns while the slip gear stays in contact with the motor through the system spring. The more the motor moves, the more the main gear moves with respect to the slip gear, and the tighter the hold the gripper has on the held tube.

The second rotary encoder monitors the slip gear. The relationship between the distance the main gear has moved with respect to the slip gear is a function of the spring and is measured by the rotary encoder value differences. The system controls the torque or force to grip the tube by understanding the encoder values and the spring force constant.

In another aspect the invention is a method of applying or measuring the force applied to a sample tube that includes the steps of driving a plurality of gripping fingers from an open position to a gripping position against a tube, while measuring the movement of first and second coaxial gears driving the fingers before the fingers grip the tube, stopping the movement of the first coaxial gear when the fingers grip the tube, and allowing and measuring a further limited movement of the second coaxial gear after the fingers grip the tube.

The step of measuring the movement of the first and second coaxial gears can include using a first rotary encoder to measure the movement of the first coaxial gear and a second rotary encoder to measure the movement of the second coaxial gear, and the step of measuring a further limited movement of the second coaxial gear after the fingers grip the tube can include connecting a defined force spring to the second coaxial gear The step of limiting the movement of the second coaxial gear can include engaging a fixed pin with a concentric (limited radius) slot in the second gear, and the step of driving the gripping fingers can include driving a rack fixed to each finger with a respective pinion gear that engages each respective rack.

The method can also include driving the first and second coaxial gears and the respective pinion gear using a main assembly shaft.

In another aspect, the invention is a motor driven gripping device for sample tubes in the laboratory context. In this aspect the gripping device includes a plurality of tube gripping fingers driven from a main assembly shaft and a motor that drives the main assembly shaft, a slip gear and an adjacent pin drive gear, both co-axially mounted on the main assembly shaft with the slip gear in a slip relationship with the pin drive gear, a pin drive rotary encoder for measuring the movement of the pin drive gear, and a slip gear rotary encoder for measuring the movement of the slip gear.

The device includes a processor in communication with both of the pin drive rotary encoder and the slip gear rotary encoder for comparing the measurements from each of the encoders.

The device includes a gear train from the pin drive gear to the plurality of tube gripping fingers. The gear train terminates at a plurality of double gears, the lower gear of each double gear acting as a pinion that drives a respective rack, and with one of the racks fixed to each of the tube gripping fingers.

An exemplary device includes four tube gripping fingers, four double gears, and four racks.

In exemplary devices, the slip gear and the pin drive gear are mounted together on a spring attachment platform, the spring attachment platform includes a spring mount with one end of a spring mounted thereto, a gripping movement limiting pin on the spring attachment platform, and the pin drive gear includes a spring mount that fixes the opposite end of the spring to the pin drive gear. A gripping movement limiting slot receives the gripping movement limiting pin so that the relative movement between the pin drive gear and the slip gear is restrained by the force of the spring and the size (included radial angle) of the gripping movement limiting slot.

In an exemplary gripping device the spring attachment platform includes two spring mounts each with one end of a spring mounted thereon and two gripping movement limiting pins. The pin drive gear includes two spring mounts that fix the respective opposite end of each of the springs to the pin drive gear, and the pin drive gear includes two gripping movement limiting slots that respectively receive the respective gripping movement limiting pins.

In another aspect the invention is a sample tube handling device that includes a housing, a tube support in the housing holding a plurality of sample tubes in the housing, a robot arm in the housing positioned to access individual tubes from among the plurality of sample tubes, a motor driven gripping device on the robot arm for grasping and moving individual sample tubes to and from the tube support, a plurality of tube gripping fingers driven from a main assembly shaft on the gripping device and driven by the motor, a slip gear and an adjacent pin drive gear, both co-axially mounted on the main assembly shaft with the slip gear in a slip relationship with the pin drive gear, a pin drive rotary encoder for measuring the movement of the pin drive gear, and a slip gear rotary encoder for measuring the movement of the slip gear.

The tube support of the sample tube handling device can include a platform and a plurality of tube holders on the platform, and the device can also include pump (e.g., peristaltic) for adding liquids to individual sample tubes.

The sample tube handling device can also include an uncapping and recapping station and a labeling and barcode reading station The foregoing and other objects and advantages of the invention and the manner in which the same are accomplished will become clearer based on the followed detailed description taken in conjunction with the accompanying drawings.

BRIEF DESCRIPTION OF THE DRAWINGS

FIG. 12 is an isolated perspective view of a pin assembly and its associated rack.

FIG. 14 is a partial cross-section partial perspective view of a tube gripping finger.

FIGS. 15 and 16 are exploded views of the motor driven gripping device.

DETAILED DESCRIPTION

Figure 1:
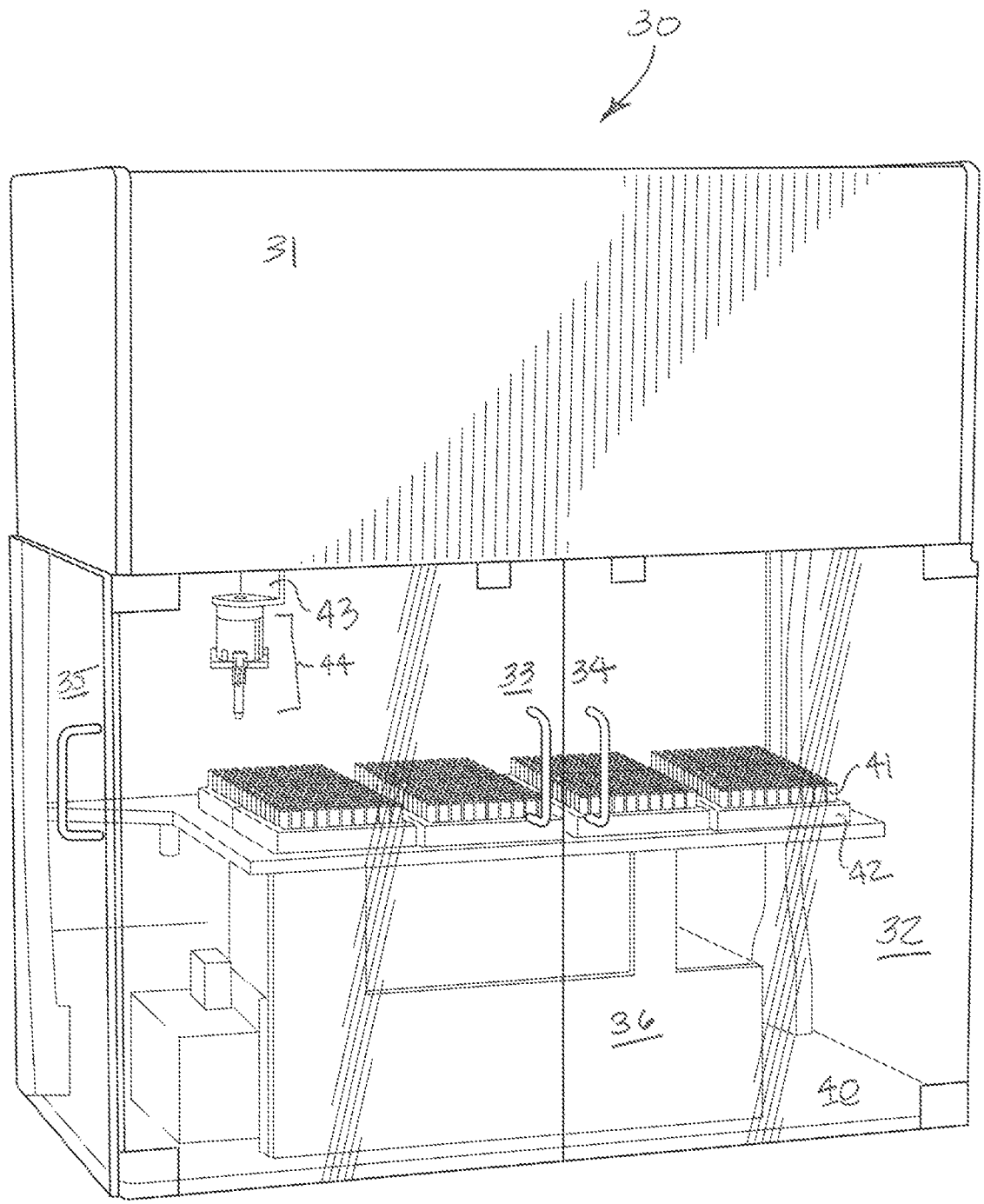
FIG. 1 is a perspective view of instrument that incorporates the gripping device according to the invention.

FIG. 1 is a perspective view of a version of the sample tube handling instrument broadly designated at 30. The tube handling instrument includes a housing illustrated as an upper cabinet 31 and a lower cabinet 32. In the illustrated embodiment the upper cabinet 31 is formed of an opaque material behind which robotic machinery can operate, while lower cabinet 32 is formed of a transparent material, typically something with relevant shatter resistant characteristics such as polyester or polycarbonate. In the illustrated embodiment the lower cabinet 32 includes front doors 33 and 34 and a side door 35.

A tube support or platform 36 rests on the floor 40 of the cabinet and in turn holds a plurality of sample tubes 41. The lower cabinet 32 can also include items such as a label printer (e.g., FIG. 17). As illustrated in FIG. 1 and as will be described further with respect to additional details of the illustrated embodiment, sample tubes such as those illustrated are typically held in tube holders illustrated at 42 which in many cases either are or resemble microtiter plates.

A robot arm 43 or gantry is in the instrument 30 and can be positioned to reach any of the sample tubes 41, and in particular is positioned to access individual tubes from among the illustrated plurality of sample tubes 41. A Cartesian or polar coordinate or spherical coordinate arm is exemplary.

A motor driven gripping device broadly designated by the bracket 44 grasps and moves individual sample tubes 41 to and from the tube support 36 and the tube holders 42. Further details of the gripping device will be made clear in connection with the other drawings.

Figure 2:
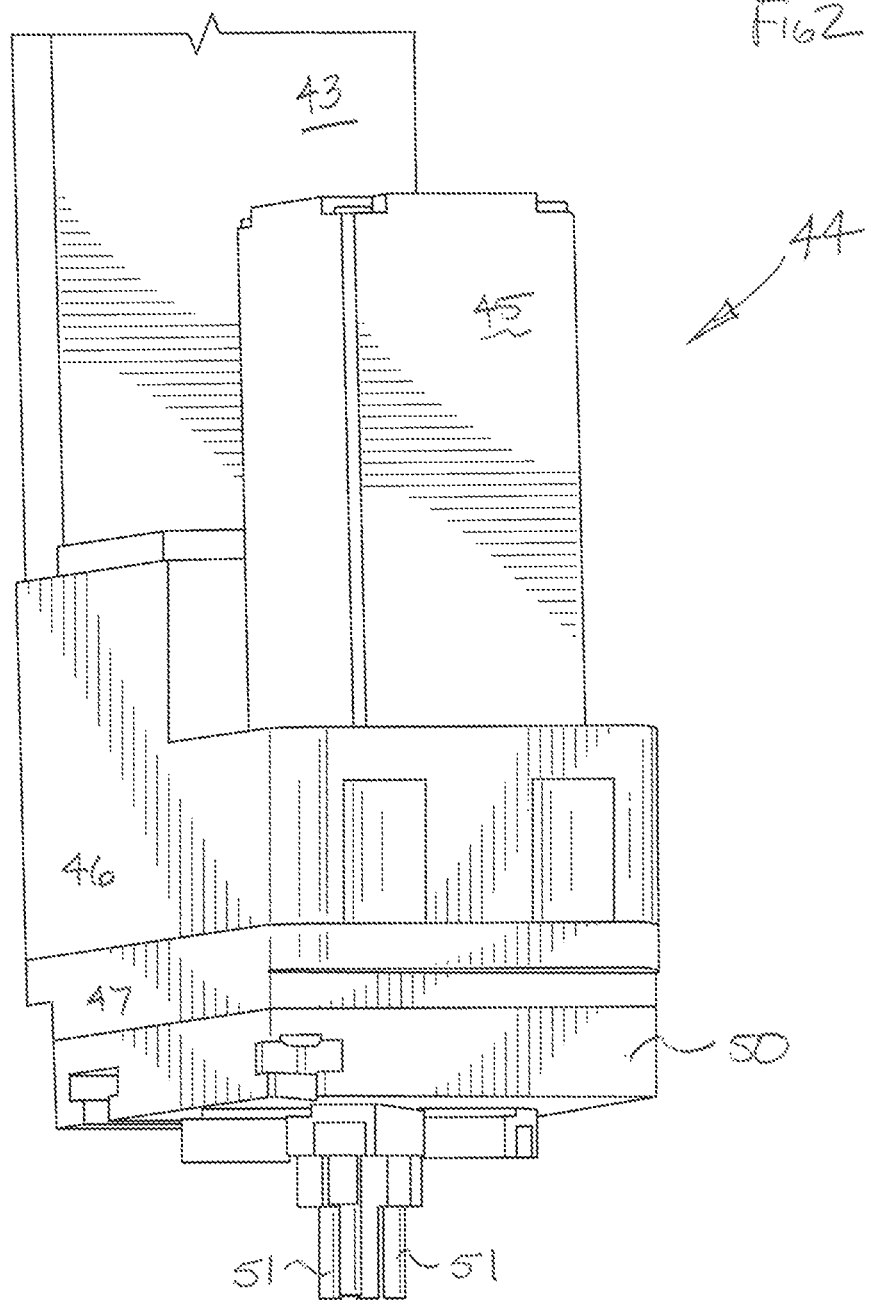
FIG. 2 is a perspective view of the gripping device according to the invention.

FIG. 2 is an enlarged view of the motor driven gripping device 44. FIG. 2 is an exterior perspective, but shows the motor 45 in its housing, an upper gear housing 46, a lower gear housing 47, and a rack and pinion slide assembly broadly designated at 50. Further details of certain of the items in FIG. 2 will be more clearly evident from other drawings, but at a minimum the tube gripping fingers 51, four of which are illustrated, are shown in a completely closed position.

Figure 3:
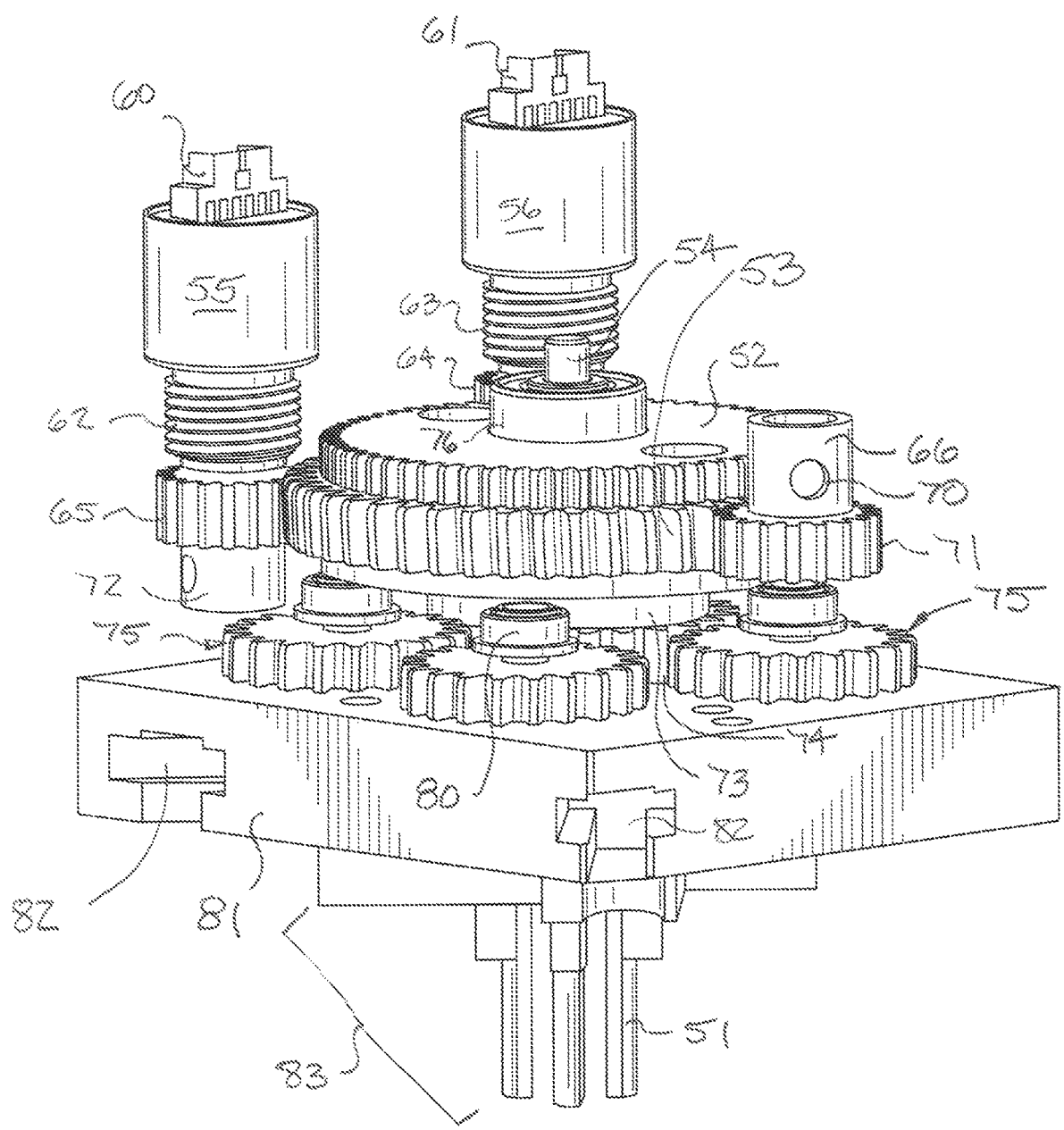
FIG. 3 is a perspective view of some of the interior parts of the gripping device according to the invention.

FIG. 3 begins to illustrate the invention, its operation, and the associated method in more detail. In particular, FIG. 3 illustrates a slip gear 52 and an adjacent pin drive gear 53. Both of these gears are coaxially mounted on a main assembly shaft 54 with the slip gear 52 in a slip relationship with the pin drive gear 53. As used herein, the term "slip" or "slipping relationship" refers to any two surfaces in contact where there is insufficient frictional grip. See, e.g., Atkins and Escudier, A Dictionary of Mechanical Engineering, Oxford University Press 2013. Stated more positively, the invention is designed for the slip gear to have at least some relative movement with respect to the pin drive gear.

In the illustrated embodiment, the gears are toothed gears.

A pin drive rotary encoder 55 is positioned to measure the movement of the pin drive gear 53 and a slip gear rotary encoder 56 is positioned to measure the movement of the slip gear 52.

The encoders 55 and 56 include respective electrical connections 60 and 61 and respective mounting threads at 62 and 63. A slip drive encoder gear 64 connects the encoder 56 to the slip gear 52 and a pin drive encoder gear 65 connects the pin drive encoder to the pin drive gear 53. FIG. 3 also illustrates the motor mount sleeve 66 with its set screw opening 70 and the motor drive gear 71. FIG. 3 shows a similar mounting sleeve 72 coaxial with the pin gear drive rotary encoder 55, and the slip drive rotary encoder 56 is coaxial with another such mounting sleeve which is not visible in the view of FIG. 3.

FIG. 3 also illustrates a lower gear support 73 which in the illustrated embodiment has a wide "T" shaped cross-section and which in turn is connected to (coaxial with) a smaller lower main drive gear 74 which in turn drives a plurality of double gears, each of which is broadly designated at 75. The lower gear support 73 and the smaller lower main drive gear 74 are coaxially mounted on the main assembly shaft 54. FIG. 3 illustrates a main assembly shaft bearing 76 and respective double gear bearings 80 (one on each double gear 75).

A rack and finger slide assembly 81, aspects of which will be further described with respect to other drawings, holds the double gears 75 and ultimately the tube gripping fingers 51. The rack and finger slide assembly 81 includes four slide channels 82, two of which are visible in the orientation of FIG. 3. FIG. 3 also illustrates that the tube gripping fingers are part of an assembly illustrated by the bracket 83.

Figure 4:
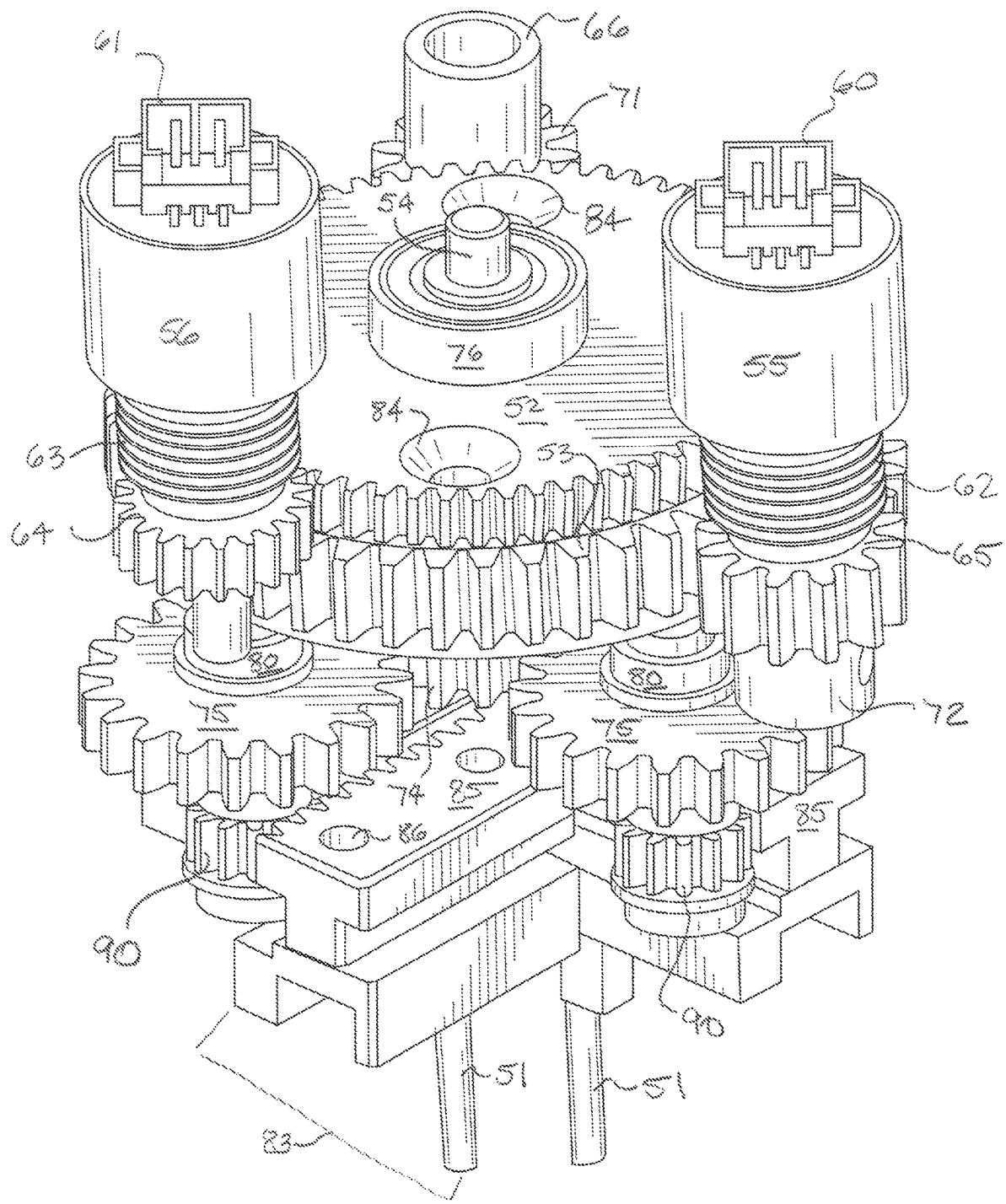
FIG. 4 is a view similar to FIG. 3, but illustrating additional parts of the mechanism.

FIG. 4 is another perspective view of the finger gripping mechanism somewhat similar to FIG. 3, but with the rack and finger slide assembly 81 removed from the drawing. All of the parts illustrated in FIG. 3 carry the same reference numerals as in FIG. 4. The items that are more clearly illustrated in FIG. 4 include the position 84 of slipped gear mounting screws, two of which positions 84 are illustrated in FIG. 4. A rack 85 is fixed to each finger assembly 83 using the illustrated set screw positions 86. In operation, the lower part 90 of each double gear 75 drives one respective rack 85. Thus, in a broad sense, the motor drive gear 71 drives the pin drive gear 53, the lower main drive gear 74, and the double gears 75 along with the racks 85 all of which together form a gear train from the motor 45 to the tube gripping fingers 51.

As used herein "gear train" (or "train") refers to any combination of gear wheels by means of which motion is transmitted from one shaft to another (Atkins supra).

The lower portion 90 of each double gear 75 acts as a pinion to drive the respective rack 85 with one of the racks 85 attached to each of the tube gripping finger assemblies 83 and thus move the tube gripping fingers 51. The illustrated embodiment includes four gripping fingers which is a convenient and symmetric number from a design standpoint. More gripping fingers could be used, but will increase space constraints and gear train complexity. Likewise, three gripping fingers would be an alternative design choice, or even two, provided they applied sufficient contact to the tube (e.g., a clamshell design).

Figure 5:
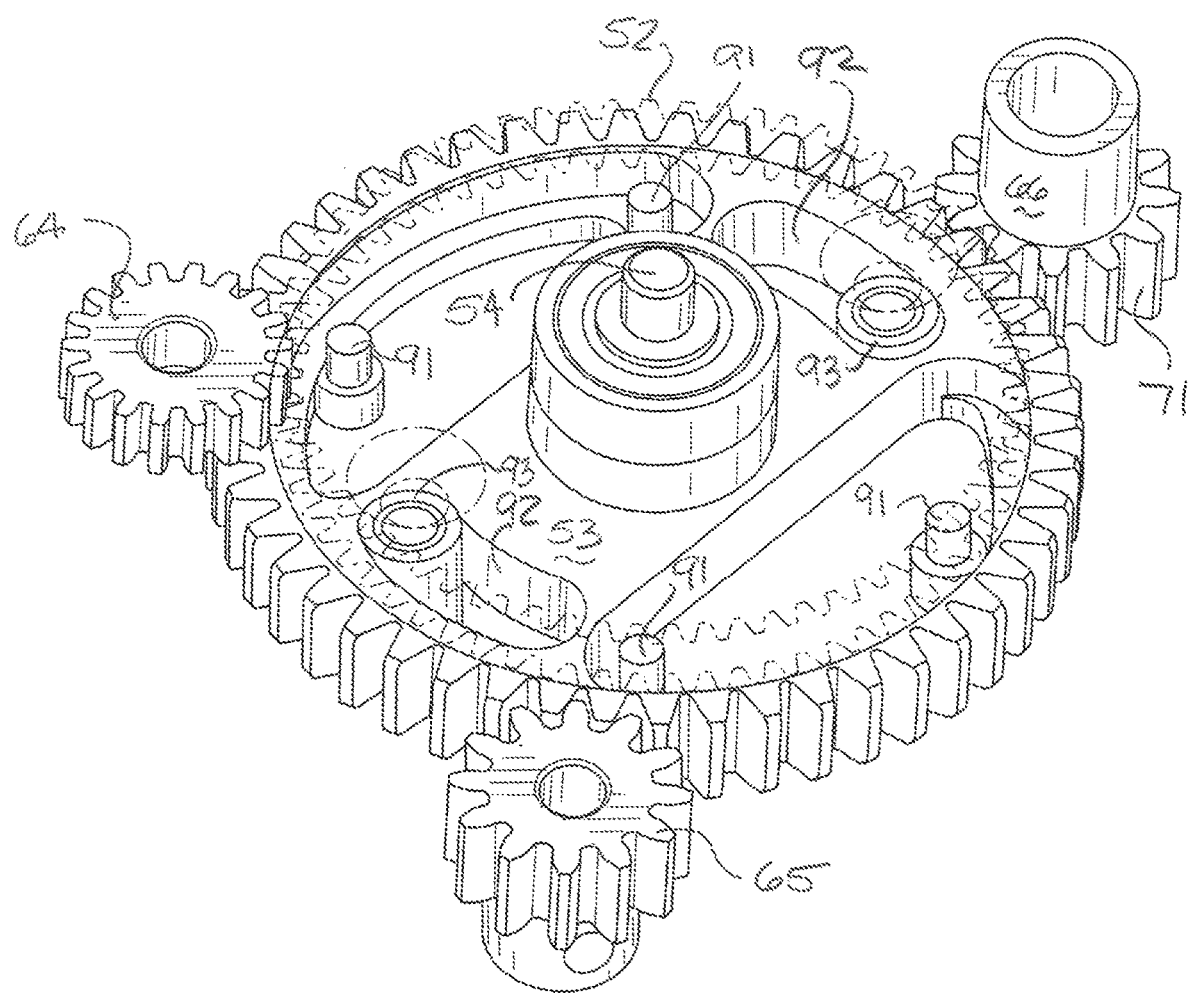
FIG. 5 is a perspective view of aspects of the slip gear and the drive gear.
Figure 6:
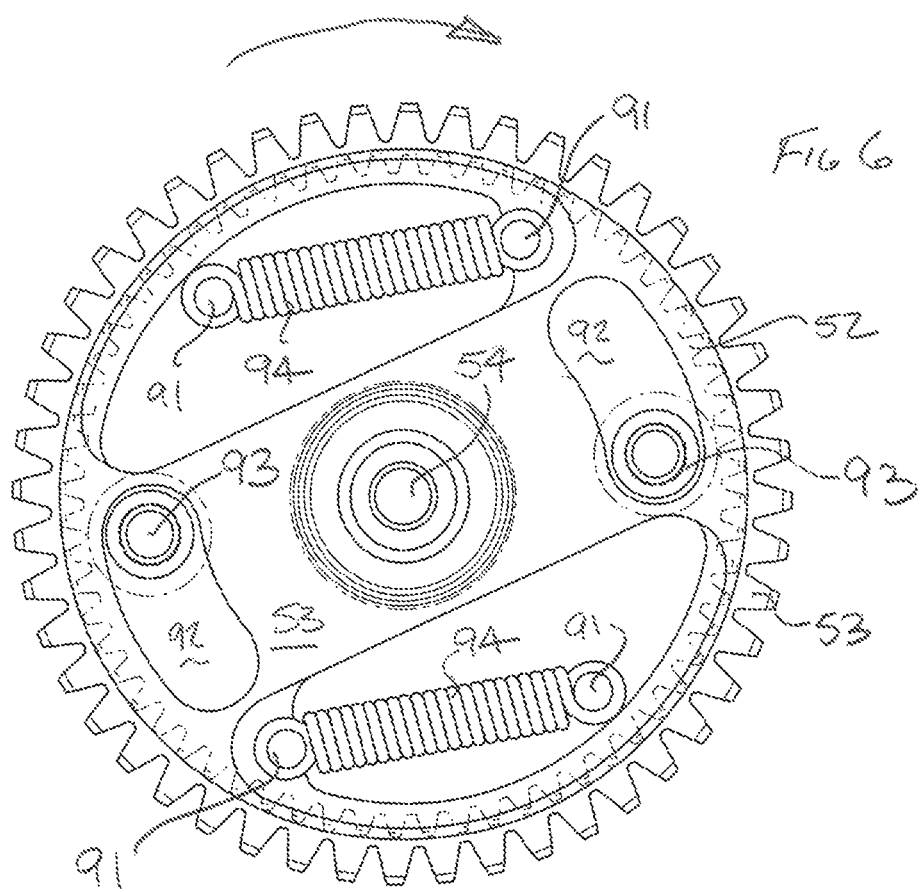
FIGS. 6 and 7 are plan views of the slip gear and the pin drive gear.
Figure 7:
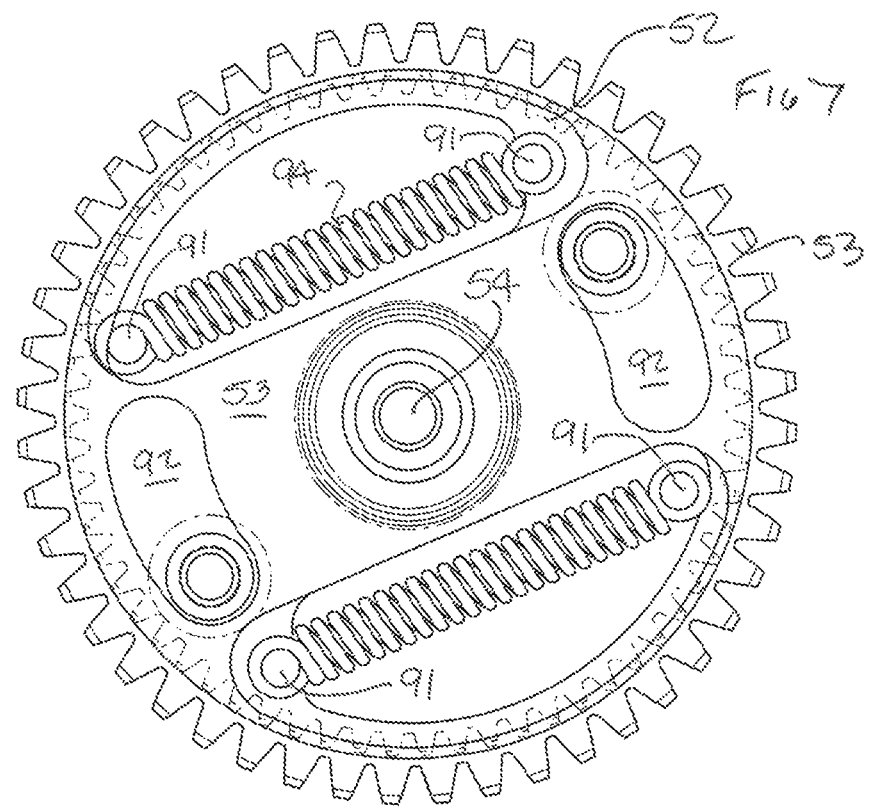

FIGS. 5, 6 and 7 illustrate structural aspects of the slip gear and drive gear that provide some of the advantages of the invention. FIG. 5 shows the slip gear 52 transparently so that aspects of the pin drive gear 53 can be seen and understood. In context, FIG. 5 illustrates the main assembly shaft 54, the motor mount sleeve 66, the slip gear encoder gear 64, the pin drive encoder gear 65, and the motor drive gear 71. FIG. 5 also illustrates that the pin drive gear 53 is in the form of a circular frame that includes spring mounting pins 91, four of which are illustrated with each pair respectively holding a spring 94 (FIGS. 6 and 7). The pin drive gear 53 also defines a pair of gripping pin movement limiting slots 92 which engage gripping pin movement limiting pins 93 which are fixed to the lower gear support 73. A pair of setscrews (not shown) fix the slip gear 52 to the gripping pin movement limiting pins 93.

FIGS. 6 and 7 are respective top plan views of the pin drive gear 53 the slip drive gear 52 (again shown transparently) with a pair of respective springs 94 attached to the spring mounting pins 91. In operation and in the orientation of FIGS. 5 and 6, a closing movement of the gripping device 44 would be represented by a clockwise rotation of the slip gear 52 and the pin drive gear 53. When the gripping fingers 51 are moving from an open position to a tube grasping position (e.g. FIGS. 9 and 10), the slip gear 52 and the pin drive gear 53 are moving together in the clockwise direction. As the slip gear 52 and the pin drive gear 53 move together, the respective encoders 55 and 56 recognize that these gears are moving together and send this informational to a processor.

Once the fingers 51 reach a tube, however, the fingers 51 no longer continue to move in the closing direction. In this state the slip gear 53 no longer moves, but the pin drive gear 52 continues to move in the clockwise direction, a movement which is initially limited by the restraining force of the springs 94, and then ultimately limited when the limiting pins 93 reach the limit of the respective slots 92. FIG. 7 illustrates the full limiting position, but it will be understood that depending upon the size of the tube being grasped (or the desired amount of force to be applied), the pin drive gear 53 does not need to move through the entire radial arc defined by the limiting slots 92.

At the same time, the respective encoders 55 and 56 recognize that the positions and movement of the slip gear 52 and the pin drive gear 53 are no longer synchronized.

A mechanical engineer will also understand that if desired, and with an appropriate adjustment, the tube gripping fingers 51 could grasp an open (un-capped) tube from the inside and apply the grasping force radiantly outwardly. In particular, this movement would begin with the fingers 51 closely positioned to one another, and finish with the fingers having moved apart to apply gripping force against the interior circumference (for cylindrical tubes) of the sample tube 41. The spring arrangement (e.g., FIGS. 5-8) would also be reversed (or added as a complementary combination of elements) to use the spring force in the inside-out context rather than the outside-in context.

Figure 8:
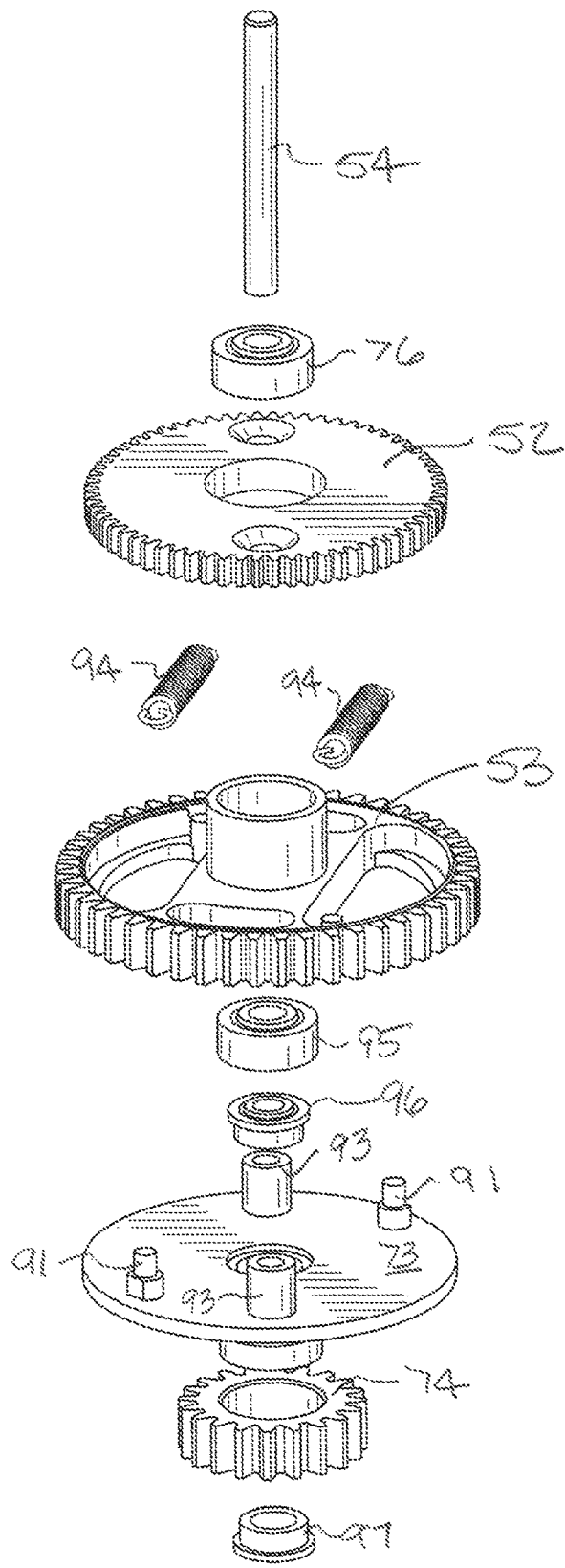
FIG. 8 is an exploded view of elements of the slip gear and the pin drive gear.

FIG. 8 is an exploded view of selected elements shown in FIGS. 3-7. FIG. 8 includes the main assembly shaft 54, the main shaft bearing 76, the slip gear 52, and the pin drive gear 53. In particular, FIG. 8 illustrates that the limiting pins 93 and one set of spring mounting pins 91 are fixed to the lower gear support 73. FIG. 8 likewise illustrates the springs 94 in the lower main drive gear 74. One or more bearings 95, 96 and 97 can be included as desired between the main elements and coaxial with the main assembly shaft 54.

Figure 9:
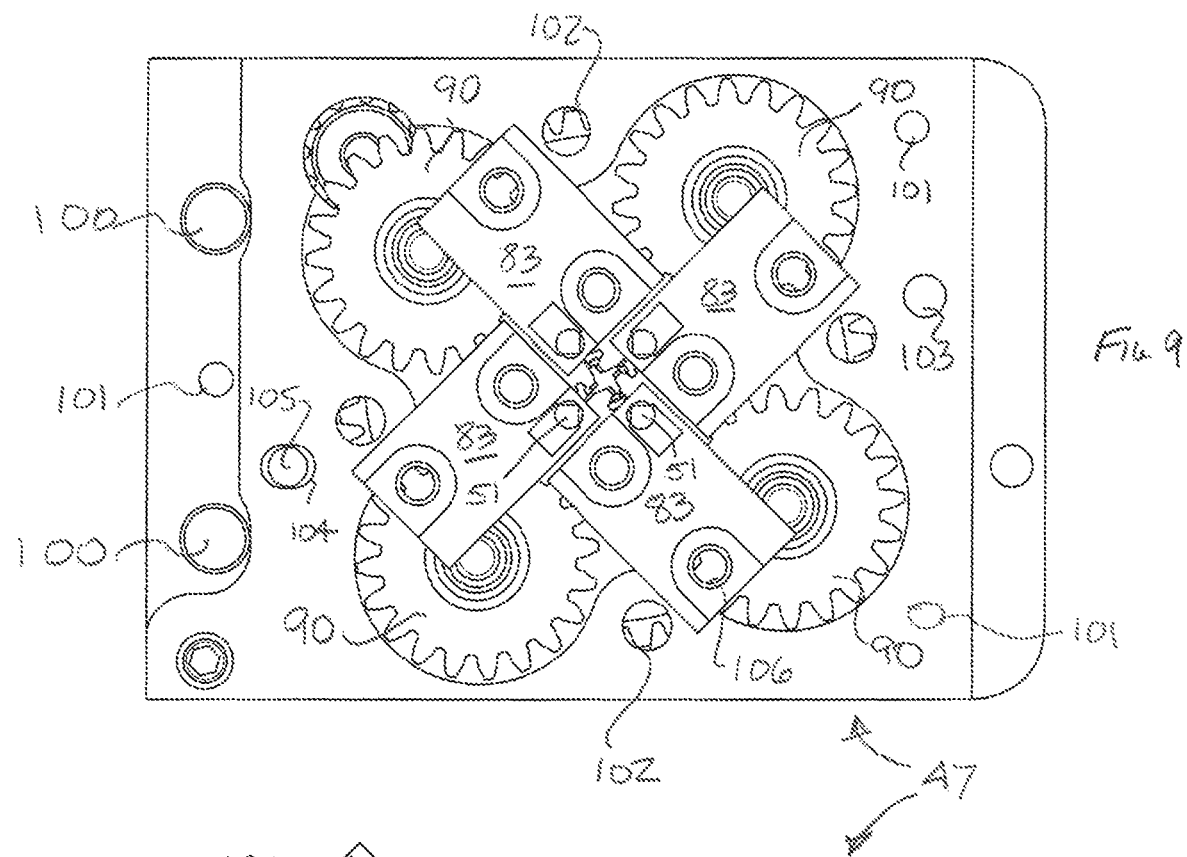
FIGS. 9, 10 and 11 are plan views illustrating relationships between and among the gear train and tube gripping fingers in respective closed and opened positions.
Figure 10:
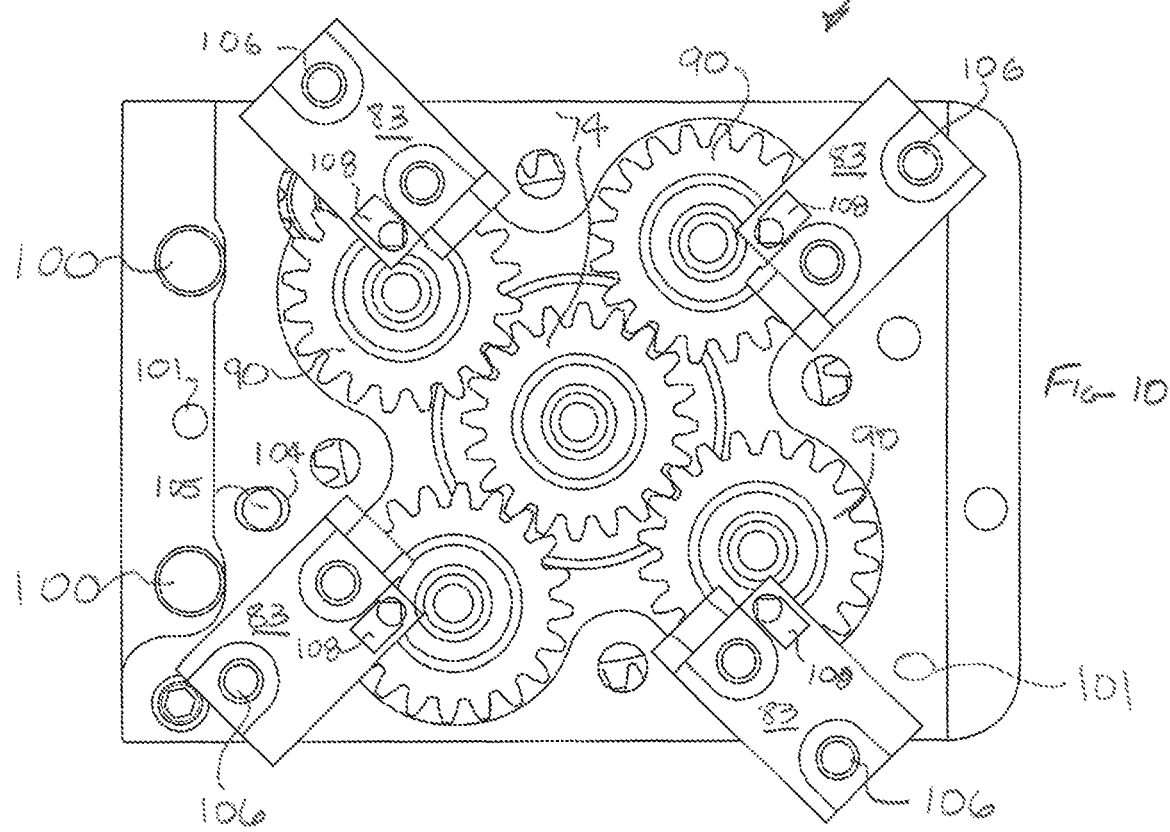
Figure 11:
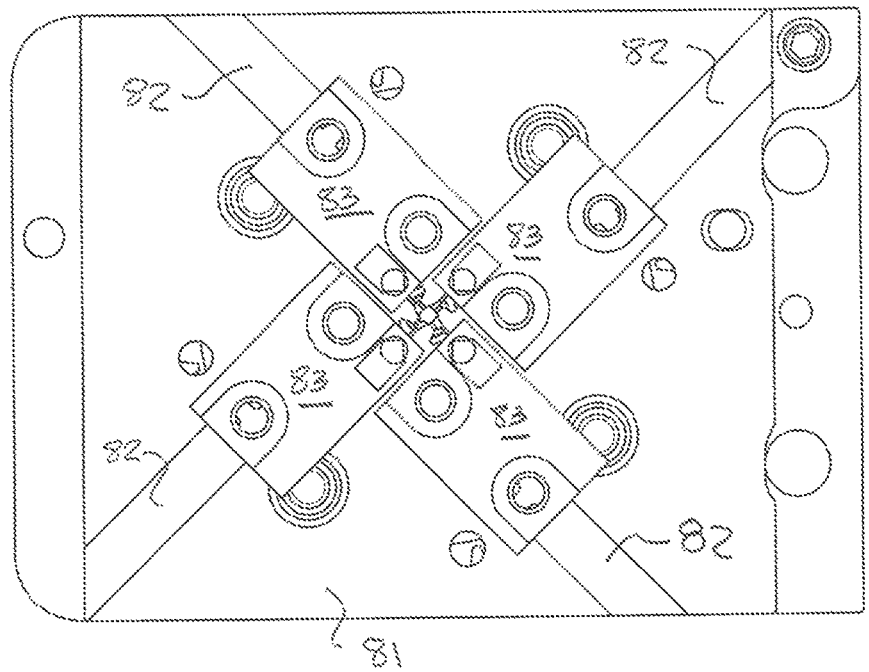

FIGS. 9, 10, and 11 are bottom plan views taken from underneath the position of the gripping fingers 51. As with some of the other illustrations, FIG. 9-11 illustrate selected parts that highlight further understanding of the invention. In general, FIG. 9 shows the pins in a fully closed position and without any tube having been grasped. FIG. 10 is an identical view but with the pins 51 in the fully open position, and again without a tube therein. FIG. 11 is most similar to FIG. 9, but as will be described herein, shows the relationship of the pin (or "finger") assemblies 83 to the rack and finger slide assembly 81 somewhat differently than FIGS. 9 and 10.

FIGS. 9 and 10 thus accordingly show a portion of the lower gear housing 47 specifically including the respective lower parts 90 of the double gears 75. A pair of mounting openings 100 are provided for mounting the lower gear housing 47 to the robot arm (FIGS. 1 and 2). Another pair of openings 101 mount the upper gear housing to the lower gear housing 47. Yet another set of openings 102 mount the lower gear housing to the slide assembly 81. The pin and matching opening shown together at 103 defines one position of the lower gear housing 81 and a kinetic opening 104 seats a kinetic pin 105. This gives the kinetic pin 105 pin limited movement while the pin 103 fixes the orientation. This simplifies assembly while keeping all of the parts aligned.

The racks 85 are not visible in FIGS. 9-11 because they are oriented behind the finger assemblies 83 in the illustrated orientation. The finger assemblies 83 are, however, attached to the racks 85 using set screws for which a pair of openings 106 are provided in each finger assembly 83.

FIGS. 9-11 illustrate that the tube gripping fingers 51 each have two chamfered edges (110, FIG. 14) along with a back support 111 that reinforces each finger 51 during a gripping movement.

FIG. 11 is the same as FIG. 9, but with the rack and finger slide assembly 81 in place and illustrating the position of the slide channels 82 with respect to the remaining elements.

Figure 13:
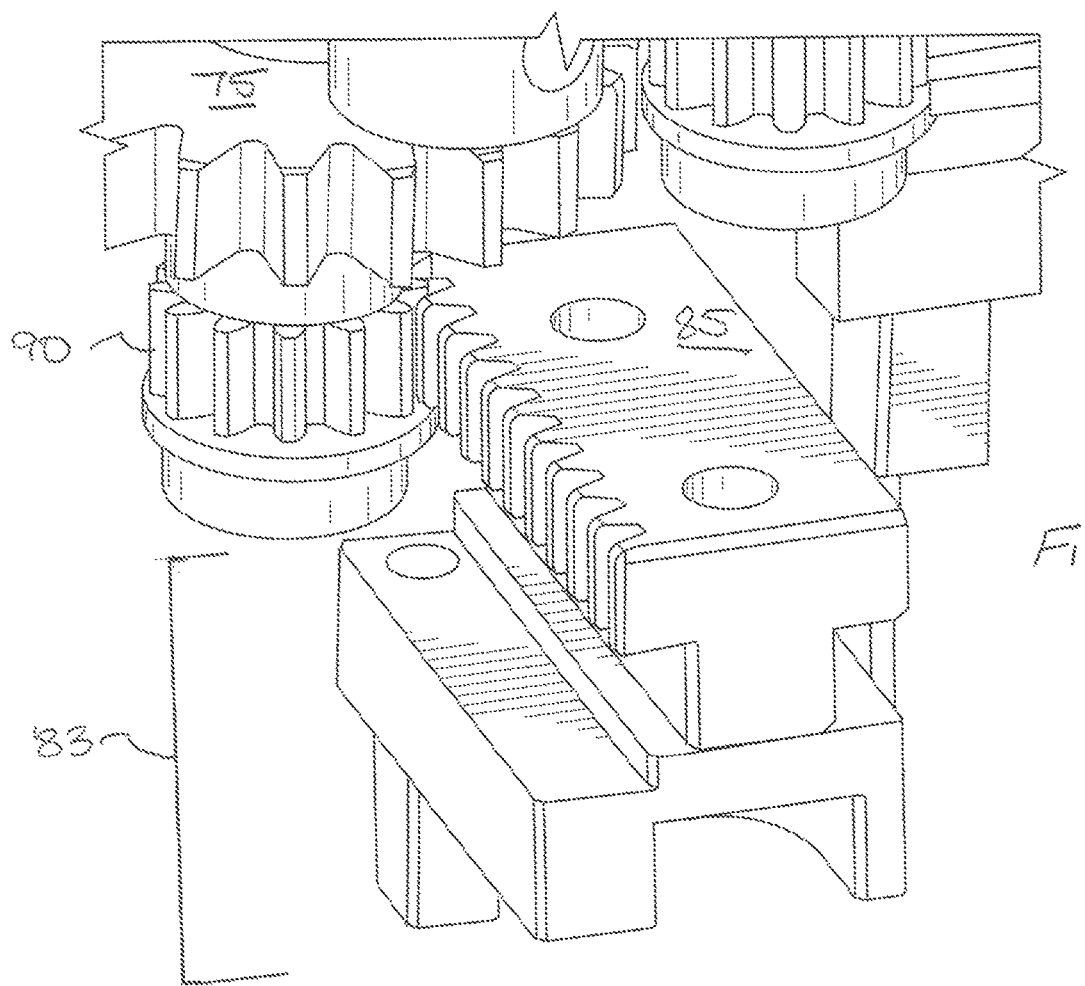
FIG. 13 is an enlarged view of a portion of the rack and pinion arrangement that moves tube gripping fingers

FIGS. 12 and 13 add some detail and enlargement to the explanations with respect to (mainly) FIGS. 9-11. FIG. 12 is an enlarged view of a finger assembly 83 attached to a rack 85. FIG. 12 thus includes a tube gripping finger 51 with its chamfered edges 110, one of which is visible in the orientation of FIG. 12. The back support 111 provides additional structural stability as the finger 51 grasps a tube. FIG. 12 also illustrates the set screw openings 106 for joining the rack 85 to the pin assembly 83. FIG. 12 additionally shows that taken in cross-section perpendicular to its direction of expected movement, the rack 85 has a T-shaped cross-section which matches the T-shaped cross-section of the slide channels 82.

FIG. 13 is an enlargement of the portions of the gripping mechanism most closely positioned to each rack 85. In the view of FIG. 13, portions of the rack and finger slide assembly 81 have been omitted to give clarity to the remaining illustrated parts. In particular, FIG. 13 gives a clear relationship between the lower part 90 of the double gear 75 along with a cut off view of the finger assembly 83 that omits the respective finger 51. FIG. 13 provides additional clarity as to the movement of the rack 85 and accordingly of the finger assembly 83, and the grasping movement.

FIG. 14 is an enlarged partial cross-sectional, partial perspective view of a respective finger 51 showing the chamfered edges 110.

Figure 16:
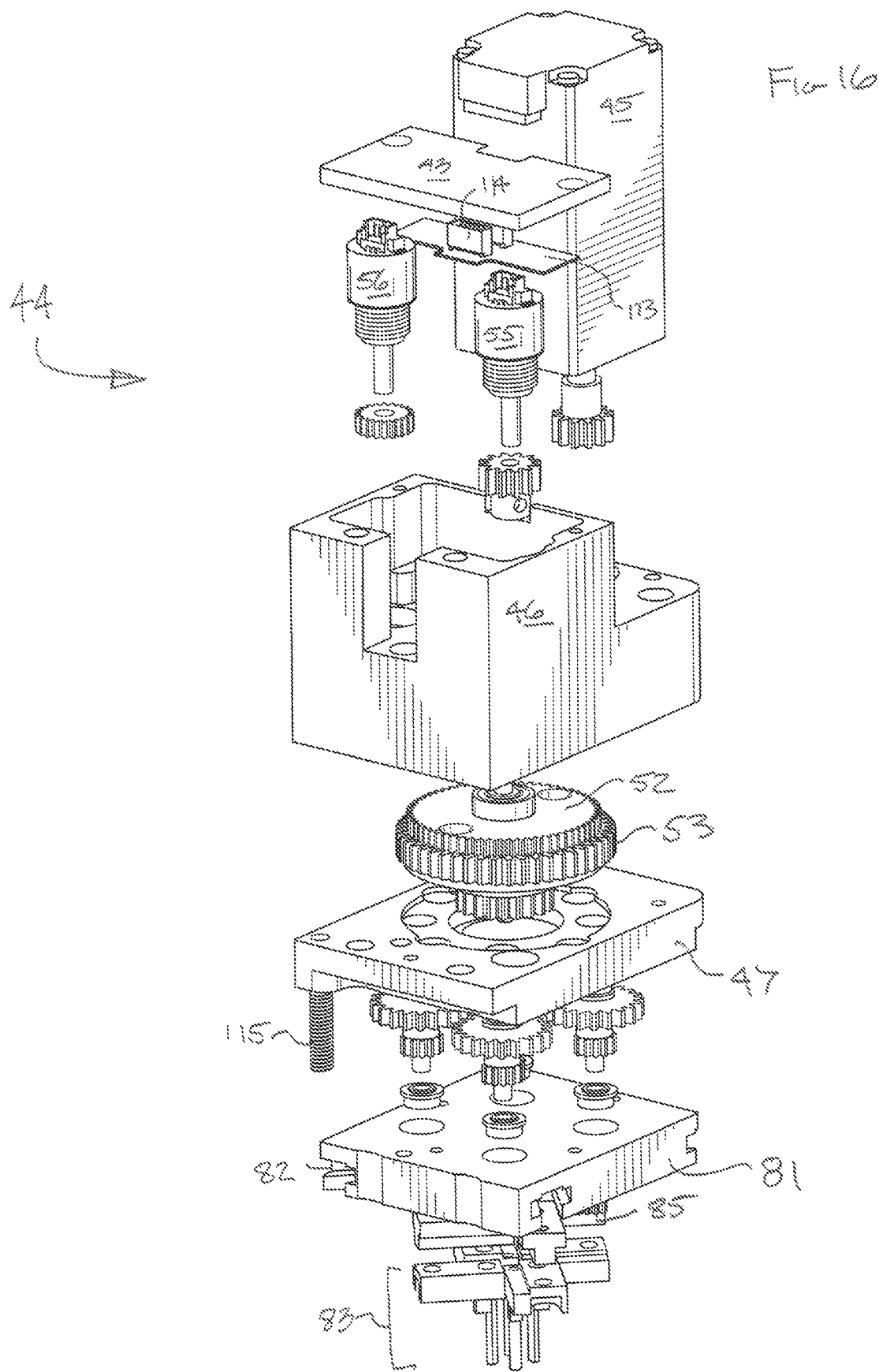

FIGS. 15 and 16 are nearly identical exploded perspective views of the motor driven gripping device 44, with the difference being that FIG. 16 is a 180° rotation around the main assembly shaft 54 as compared to FIG. 15. It will be understood that not every feature illustrated in FIG. 15 or 16 is called out in this and the following discussion, particularly where these elements have been described previously, or are evident to the skilled person, or mere minor design choices. As always, however, the illustrations form part of this specification.

FIGS. 15 and 16 both illustrate the motor 45 on a portion of the robot arm 43. The encoders 55 and 56 are in a more visible position in the orientation of FIG. 16 as is an electronics board 113 and its processor 114. As set forth with respect to the method aspects, the information from the encoders 55 and 56 can be used to measure or apply relative force to a tube depending upon the force needed in a particular grasping situation (e.g., grasping for uncapping generally requiring more force than grasping for simple movement). Each of FIGS. 15 and 16 show the upper gear housing 46 and the lower gear housing 47.

FIG. 15 gives a better view of the main assembly shaft 54, while both figures offer a clear orientation of the slip gear 52, the pin drive gear 53, the double gears 75, the rack and finger slide assembly 81, a portion of one of the racks 85 and several of the pin assemblies 83 in the closed orientation.

FIGS. 15 and 16 do, however, add a view of the slide stop 115. Only one such slide stop is included and illustrated because only one is necessary. Stated differently, once one of the combined rack 85 and finger assemblies 83 reaches the slide stop 115, the gear train relationships preclude further opening movement of any of the remaining racks 85 and their associated finger assemblies 83.

The invention also includes a method of applying a defined force, or measuring the force applied to, a sample tube (typically a laboratory or medical sample tube). The method includes the steps of driving a plurality of gripping fingers 51 from an open position to a gripping position against a tube 41 while measuring the movement of first and second coaxial gears 52, 53, driving the fingers before the fingers 51 grip the tube 41, stopping the movement of the first coaxial gear (illustrated herein as the slip gear 52) when the fingers 51 grip the tube 41, and then allowing and measuring a further limited movement of the second coaxial gear (illustrated as the pin drive gear 53) after the fingers 51 grip the tube 41.

The step of measuring the movement of the first and second coaxial gears comprises using a first rotary encoder (56) to measure the movement of the first coaxial gear (52) and a second rotary encoder (55) to measure the movement of the second coaxial gear (53). The method of limiting the movement of the second coaxial gear 53 can further comprise applying a defined spring force to the second coaxial gear 53.

The step of limiting the movement of the second coaxial gear 53 can also comprise engaging a fixed pin 93 with a concentric limited radius slot 92 in the second coaxial gear 53. The step of driving the gripping fingers 51 includes driving a rack 85 connected to a respective finger 51 with a respective pinion gear 90 that engages each respective rack 85. The first 52 and second 53 coaxial gears and the respective pinion gear 90 are driven from a common main assembly shaft 54 potentially including a drive train.

In terms of the overall operation, and describing the movement of a single tube, the operation begins when the controller (processor) instructs the instrument to pick up and move a tube. This in turn begins with instructions to the robotic arm to move the gripping mechanism to the defined Cartesian or polar position of the desired tube. When the robot has moved to the defined position, the instrument provides several method options. These can include moving a tube to a labeler and labeling the tube, adding a reagent to a tube (or to a just-labeled tube), or removing a cap, either as a standalone step, or as part of several steps within a desired (i.e., defined and selected) method.

The motor moves the pins as described in detail previously herein and at some point the moving pins engage a tube. When the pins engage a tube, the pin drive gear and the slip gear stop, and the rotary encoders are in sync. This is a momentary state.

Immediately thereafter, however, the drive gear continues to move, and the encoders and processor recognize that the difference between encoders means that the pins have engaged a tube. The processor recognizes (is programmed to recognize) the force desired to grasp the tube in the selected method. Therefore, the difference to which the drive gear must move with respect to the slip gear to apply the desired force to the tube is known or calculated.

The drive gear encoder then drives the drive gear and the springs until the encoder and processor reach the desired position and therefore applying the desired force to the tube.

Once the desired force is on the tube, the instrument can move the tube to the labeling position, or the uncapping position, or both. When the desired manipulation of the tube (uncapping, reagent addition, etc.) is finished, the robot can return the tube to its original position, or some different desired position. The processor will recognize the tube as having been released when the encoders returned to synchronized movement.

The structure and method allows the tubes to be grasped with a light touch and then tightened as may be required for the next manipulative step; e.g. uncapping. This uses force most efficiently and saves and preserves the physical elements of the device.

As another advantage, if it tube fails, or drops, or is out of position or absent for any reason, the rotary encoders returned to sync earlier than expected, thus signaling the problem.

Any appropriate rotary encoder will suffice, with the exemplary embodiment using magnetic encoders. The method and structure could theoretically use other (e.g., optical) encoders to read the relevant movements, but the magnetic encoders are easier to implement, more robust, and cost advantageous.

Tubes can be positioned in any compact array that a user wants or needs. Therefore the user can define (in a "method") an open position for the fingers (i.e., that avoids hitting tubes on the back swing), a pick up position, a pick up force, and (e.g.) an uncapping force and position.

Figure 17:
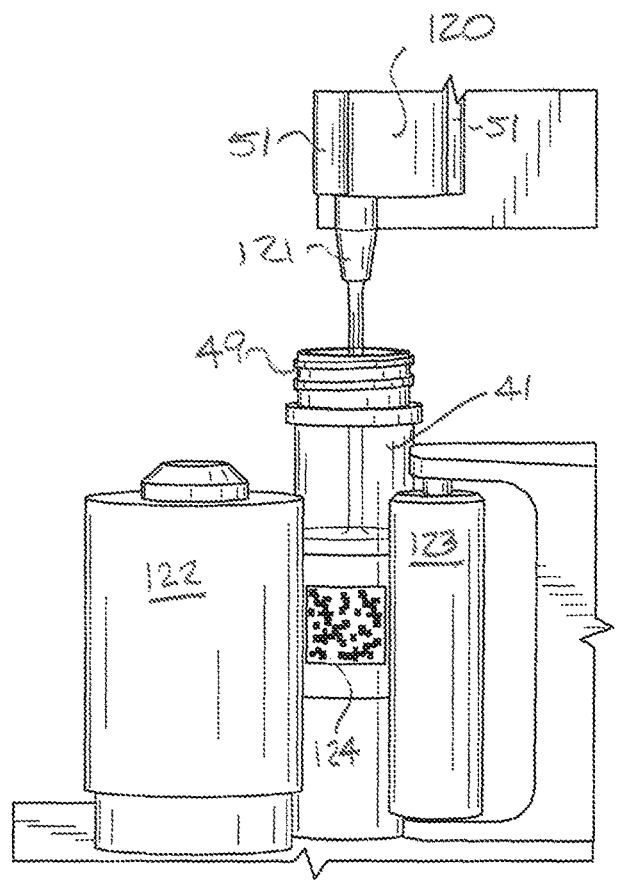
FIG. 17 is a side elevation view illustrating the tube gripping fingers grasping a tube cap 120 with a labeled tube maintained in position by a tube driving roller and a tube follower roller.
Figure 18:
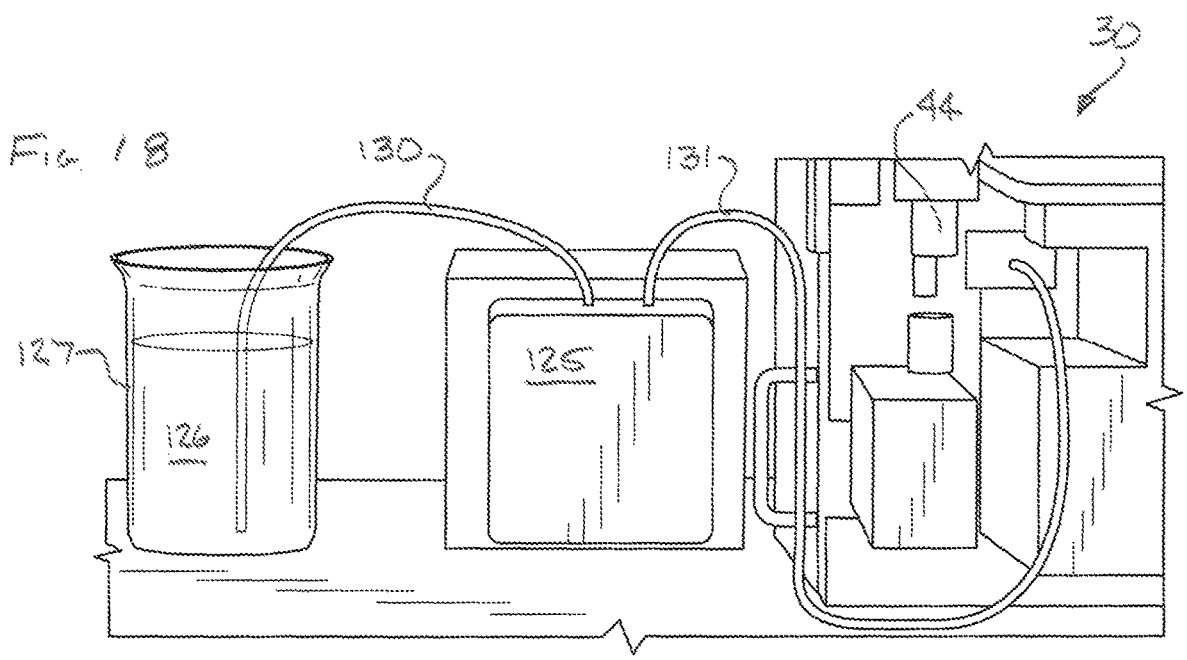
FIG. 18 is a partial perspective and partial sectional view illustrating that the instrument can be used in conjunction with a pump that draws from a fluid supply in a beaker through a tube from the beaker to the pump.

FIGS. 17 and 18 are enlarged views of a sample tube handling device according to the invention that includes an uncapping and recapping station, a labeling and barcode reading station, a nozzle for delivering fluids to sample tubes and a pump for delivering fluids to the nozzle and tubes.

In particular FIG. 17 illustrates the tube gripping fingers 51, two of which are illustrated, grasping a tube cap 120 removed from an exemplary sample tube 41 illustrated with threads 49. A nozzle 121 delivers fluid into the tube 41 which is maintained in position by a tube driving roller 122 and a tube follower roller 123. FIG. 17 illustrates a status or state in which the tube 41 has been labeled with a barcode 124 or its equivalent such as a QR code (e.g., Quick Response code, matrix barcode, two-dimensional barcode) or a radio frequency identification (RFID) chip, or the like. The operation of the gripping device (44 in FIG. 1 and thereafter) in terms of placing the tube in position has already been described, and once the tube is released from the fingers 51 and held in place by at least the tube drive roller 122 and the follower roller 123 (or some combination that provides at least three points of contact), the driving action of the drive roller 122 combined with the stationary state of the fingers 51 will uncap the tube 41. It will also be understood that tubes without caps can be placed between the drive roller 122 and the follower roller 123 for purposes of being labeled or filled or any other step that does not require a capped tube or that does not require that the cap be removed from the tube 41.

FIG. 18 illustrates that the instrument 30 (FIG. 1) can be used in conjunction with a pump 125, typically a peristaltic pump because of its capacity to deliver amounts of fluid that are both small and precise. In the illustrated embodiment the pump 125 draws from a fluid supply 126 in a beaker 127 through a tube 130 from the beaker 127 to the pump 125. In turn, the pump 125 can supply fluid to the instrument 30 (only a portion of which is visible in FIG. 18) through a second tube 131 which eventually reaches the nozzle 121.

The specific mechanical details of the drive rollers, follower roller, the addition of fluid from a nozzle, the use of a pump and tubing to deliver liquid from the supplier, tube labelling, and tube capping and uncapping are otherwise conventional in this art and can be practiced by the skilled person without undue experimentation.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A method of applying or measuring the force applied to a sample tube comprising the steps of:
   driving a plurality of gripping fingers from an open position to a gripping position against a tube; while
   measuring the movement of first and second coaxial gears driving the fingers before the fingers grip the tube;
   stopping the movement of the first coaxial gear when the fingers grip the tube; and allowing and measuring a further limited movement of the second coaxial gear after the fingers grip the tube.

2. A method of applying or measuring the force to a sample tube according to claim 1 wherein the step of measuring the movement of the first and second coaxial gears comprises using a first rotary encoder to measure the movement of the first coaxial gear and a second rotary encoder to measure the movement of the second coaxial gear.

3. A method of applying or measuring the force to a sample tube according to claim 1 wherein the step of measuring a further limited movement of the second coaxial gear after the fingers grip the tube comprises connecting a defined force spring to the second coaxial gear.

4. A method of applying or measuring the force to a sample tube according to claim 3 wherein the step of limiting the movement of the second coaxial gear comprises engaging a fixed pin with a concentric slot in the second coaxial gear.

5. A method of applying or measuring the force to a sample tube according to claim 1 wherein the step of driving the gripping fingers comprises driving a respective rack fixed to each respective finger with a respective pinion gear that engages each respective rack.

6. A method of applying or measuring the force to a sample tube according to claim 5 comprising driving the first and second coaxial gears and the respective pinion gear using a main assembly shaft.

7. A motor driven gripping device for sample tubes in the laboratory context, said gripping device comprising:
a plurality of tube gripping fingers driven from a main assembly shaft and a motor that drives said main assembly shaft;
a slip gear and an adjacent pin drive gear, both co-axially mounted on said main assembly shaft with said slip gear in a slip relationship with said pin drive gear;
a pin drive rotary encoder for measuring the movement of said pin drive gear; and
a slip gear rotary encoder for measuring the movement of said slip gear; and
a defined force spring connected to said pin drive gear so that the relative movement between said pin drive gear and said slip gear is restrained by the force of said spring.

8. A gripping device according to claim 7 and further comprising a processor in communication with both of said pin drive rotary encoder and said slip gear rotary encoder for comparing the measurements from each of said encoders.

9. A gripping device according to claim 7 comprising a gear train from said pin drive gear to said plurality of tube gripping fingers.

10. A gripping device according to claim 9 wherein
said gear train terminates at a plurality of double gears, the lower gear of each said double gear acting as a pinion that drives a respective rack; and
one of said respective racks is fixed to each of said tube gripping fingers.

11. A gripping device according to claim 10 comprising four tube gripping fingers;
four double gears; and
four racks.

12. A gripping device according to claim 7 wherein said slip gear and said pin drive gear are mounted together on a spring attachment platform; and said spring attachment platform includes a spring mount with one end of said defined force spring mounted thereto; and
a gripping movement limiting pin on said spring attachment platform; and
wherein said pin drive gear includes a spring mount that fixes the opposite end of said spring to said pin drive gear; and
a gripping movement limiting slot that receives said gripping movement limiting pin;
so that the relative movement between said pin drive gear and said slip gear is restrained by the force of the spring and the size of the gripping movement limiting slot.

13. A gripping device according to claim 12 wherein:
said spring attachment platform includes two spring mounts each with one end of a spring mounted thereon and two gripping movement limiting pins; and
said pin drive gear includes two spring mounts that fix the respective opposite end of each of said springs to said pin drive gear; and
said pin drive gear includes two gripping movement limiting slots that respectively receive said respective gripping movement limiting pins.

14. A sample tube handling device comprising:
a housing;
a tube support in said housing holding a plurality of sample tubes in said housing;
a robot arm in said housing positioned to access individual tubes from among said plurality of sample tubes;
a motor driven gripping device on said robot arm for grasping and moving individual sample tubes to and from said tube support;
a plurality of tube gripping fingers driven from a main assembly shaft on said gripping device and driven by said motor;
a slip gear and an adjacent pin drive gear, both co-axially mounted on said main assembly shaft with said slip gear in a slip relationship with said pin drive gear;
a pin drive rotary encoder for measuring the movement of said pin drive gear; and
a slip gear rotary encoder for measuring the movement of said slip gear; and
a defined force spring connected to said pin drive gear so that the relative movement between said pin drive gear and said slip gear is restrained by the force of said spring.

15. A sample tube handling device according to claim 14 wherein said tube support comprises a platform and a plurality of tube holders on said platform.

16. A sample tube handling device according to claim 14 further comprising a peristaltic pump for adding liquids to individual sample tubes.

17. A sample tube handling device according to claim 14 further comprising an uncapping and recapping station.

18. A sample tube handling device according to claim 14 further comprising a labeling and barcode reading station.

19. A sample tube handling device according to claim 14 further comprising further comprising a processor in communication with both of said pin drive rotary encoder and said slip gear rotary encoder for comparing the measurements from each of said encoders.

20. A sample tube handling device according to claim 14 further comprising a gear train from said pin drive gear to said plurality of tube gripping fingers.

* * * * *